United States Patent [19]
Lee

[11] Patent Number: 5,893,192
[45] Date of Patent: Apr. 13, 1999

[54] WINDSHIELD WIPER FOR AUTOMOBILES

[75] Inventor: Kwang Yul Lee, Daegu, Rep. of Korea

[73] Assignee: Kyung Chang Wiper System Co., Ltd., Daegu, Rep. of Korea

[21] Appl. No.: 09/047,572

[22] Filed: Mar. 25, 1998

[30] Foreign Application Priority Data

Feb. 21, 1998 [KR] Rep. of Korea ............ 98-5502

[51] Int. Cl.$^6$ .................. B60S 1/04; B60S 1/38
[52] U.S. Cl. .................. 15/250.201; 15/250.44
[58] Field of Search ............ 15/250.201, 250.44, 15/250.48, 250.361, 250.46, 250.451, 250.452, 250.453, 250.47

[56] References Cited

U.S. PATENT DOCUMENTS

| | | | |
|---|---|---|---|
| 1,852,480 | 4/1932 | Ruetz | 132/309 |
| 1,924,152 | 8/1933 | Coney et al. | 15/110 X |
| 2,088,839 | 8/1937 | Coney et al. | 15/110 X |
| 2,154,846 | 4/1939 | Heymann et al. | 15/188 X |
| 2,219,753 | 10/1940 | Sequin | 15/188 |
| 3,103,027 | 9/1963 | Birch | 15/110 |
| 3,673,631 | 7/1972 | Yamadai et al. | 15/250.201 |
| 4,628,565 | 12/1986 | Wolter | 15/250.44 |
| 5,435,041 | 7/1995 | Ho | 15/250.201 |
| 5,509,166 | 4/1996 | Wagner et al. | 15/250.44 |
| 5,666,687 | 9/1997 | Charng | 15/250.201 |

FOREIGN PATENT DOCUMENTS

| | | | |
|---|---|---|---|
| 3532535 | 3/1987 | Germany | 15/250.44 |
| 51-10498 | 3/1976 | Japan . | |
| 93-14023 | 7/1993 | Rep. of Korea . | |
| 1572869 | 6/1990 | U.S.S.R. | 15/250.201 |
| 1040936 | 9/1966 | United Kingdom | 15/250.201 |

Primary Examiner—Gary K. Graham
Attorney, Agent, or Firm—Jacobson, Price, Holman & Stern, PLLC

[57] ABSTRACT

A windshield wiper for automobiles is disclosed. The wiper allows the wind to smoothly pass through the wiper frame while reducing wind resistance, thereby being stably kept on the windshield. The wiper has a spoiler part and a vent opening at both side portions of the frame's top wall, thus being free from any interference between a wiper arm and the wiper frame while mounting the wiper arm to the wiper frame. Both the spoiler part and the vent openings are individually formed by cutting the frame's top wall from corner to corner, thus being free from any corner causing a vortex of air. The frame's upper side wall has a width of less than that of the lower side wall, thus forming a gap helping to keep the wiper on the windshield. A reinforcing rib is formed between the spoiler parts and a reinforcing rib is also formed between the vent openings, thereby improving the strength of the wiper frame.

5 Claims, 6 Drawing Sheets

WINDSHIELD WIPER FOR AUTOMOBILES

BACKGROUND OF THE INVENTION

1. Field of the Invention

The present invention relates to, in general, a windshield wiper for automobiles and, more particularly, to a wiper capable of reducing wind resistance, thereby being stably kept on the windshield.

2. Description of the Prior Art

As well known to those skilled in the art, a windshield wiper for automobiles is mounted to the lower portion of a windshield so as to selectively wipe the windshield.

An example of typical wipers for automobiles is referred to in Japanese Utility Model Publication No. 51-10498. The above wiper is schematically shown in FIGS. 5a and 5b.

As shown in FIGS. 5a and 5b, the wiper comprises a wiper frame 100 and two or more blade stays 107. The wiper frame 100, having a smoothly curved cross-section suitable for generating aerodynamic drag and lift, is connected to a wiper arm (not shown). The two stays 107 are connected to the wiper frame 100 at both side portions. The stays 107 individually have a V-shaped cross-section and are provided with vent holes 110 at positions around the center as best seen in FIG. 5b. A blade 115 is supported by the two stays 107. In order to connect the blade 115 to the stays 107, the blade 115 has a yoke part 116 holding the fitting parts of the stays 107.

However, the above Japanese wiper is problematic in that it may be unexpectedly lifted from the windshield when wind passes through the vent holes 110 of the stays 107.

Another example of typical wipers is referred to in Korean Utility Model Publication No. 93-14023 of the inventors of this invention. The above wiper is schematically shown in FIGS. 6a and 6b.

As shown in FIGS. 6a and 6b, the wiper 201 includes two longitudinal vent holes 203 with a spoiler 204 being provided at the edge of each vent hole 203. In order to form the above vent holes 203, the top wall of a wiper frame 202 is cut in three directions. That is, the top wall of the wiper frame 202 is cut along a U-shaped line at both side portions prior to bending the cut parts upwardly at an angle of inclination, thus forming two vent holes 203 and two spoilers 204. A side wall 206 is integrated with each end of the spoilers 204, thus closing the ends of the spoilers 204. The spoiler 204 helps to keep the wiper 201 on the windshield, thus preventing the wiper 201 from being unexpectedly separated from the windshield.

However, the above wiper 201 is problematic in that a vortex of air is formed around the side walls 206 and causes the wiper 201 to be unexpectedly separated from the windshield, thus making the wiper 201 lose its wiping function.

In addition, since the wiper frame 202 is cut so as to form both the vent holes 203 and the spoilers 204, the strength of the wiper 201 is reduced, thus causing the frame 202 to be easily deformed.

FIG. 6b is a sectional view of the wiper taken along the line 6b—6b of FIG. 6a. As shown in FIG. 6b, the wiper frame 202 has a generally U-shaped cross-section with a corner 205 being formed between each side wall and the top wall of the frame 202. The wind thus runs into the corner 205 when the wind is introduced into the wiper frame 202 and is upwardly discharged from the frame 202 through the vent holes 203. As a result, the wiper 201 may be unexpectedly separated from the windshield Also, since the two spoilers 204 are upwardly protruded from the top wall of the wiper frame 202, the wiper arm is brought into contact with the top portion of one of the two spoilers 204 while mounting the wiper arm to the wiper frame 202. Such contact makes it difficult to mount the wiper arm to the wiper frame 202 and causes an interference between the spoilers 204 and the wiper arm during the operation of the wiper 201.

SUMMARY OF THE INVENTION

Accordingly, the present invention has been made with the above problems occurring in the prior art in mind, and an object of the present invention is to provide a windshield wiper for automobiles, which is capable of allowing the wind to smoothly pass through while reducing wind resistance, thereby being stably kept on the windshield.

Another object of the present invention is to provide a windshield wiper, which has a spoiler part at one side portion of the frame's top wall and a vent opening at the other side portion of the top wall, thus being free from any interference between a wiper arm and the wiper frame while mounting the wiper arm to the wiper frame.

A further object of the present invention is to provide a windshield wiper, of which both the spoiler part and the vent opening are individually formed by cutting the frame's top wall from corner to corner, thus being free from any corner causing a vortex of air, and of which the frame's upper side wall has a width of less than that of the lower side wall, thus forming a gap helping to keep the wiper on the windshield.

A still another object of the present invention is to provide a windshield wiper, which has a reinforcing rib between the spoiler parts and a reinforcing rib between the vent openings, thereby improving the strength of the wiper frame.

In order to accomplish the above objects, the present invention provides a windshield wiper for automobiles including a longitudinal wiper frame connected to a wiper arm, at least two stays mounted to both end portions of the wiper frame and a longitudinal blade held by the stays, comprising: two or more spoiler parts formed on one side portion of a wiper frame's top wall, each of the spoiler parts comprising: an inclined top spoiler formed by partially cutting at a position around a junction between the top wall and an upper side wall and bending a cut part upwardly at an angle of inclination with a vent hole being defined on the top wall; and two side slant walls closing both ends of the top spoiler; a reinforcing rib formed between the spoiler parts so as to increase strength of the wiper frame; and a plurality of vent openings formed on the other side portion of the wiper frame's top wall.

BRIEF DESCRIPTION OF THE DRAWINGS

The above object, and other features and advantages of the present invention will be more clearly understood from the following detailed description taken in conjunction with the accompanying drawings, in which.

3

Figure 5A:
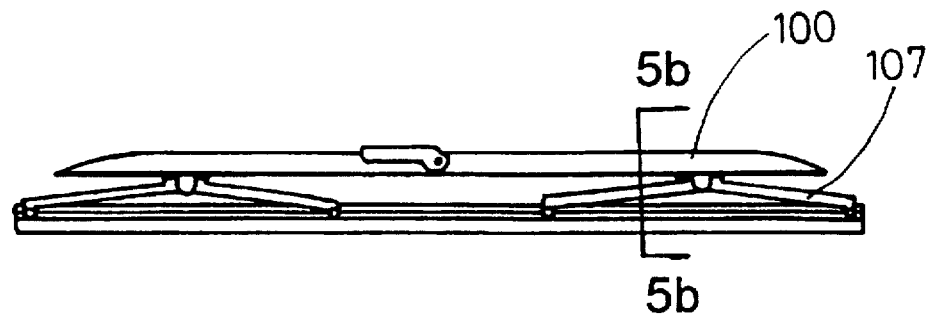
Figure 5B:
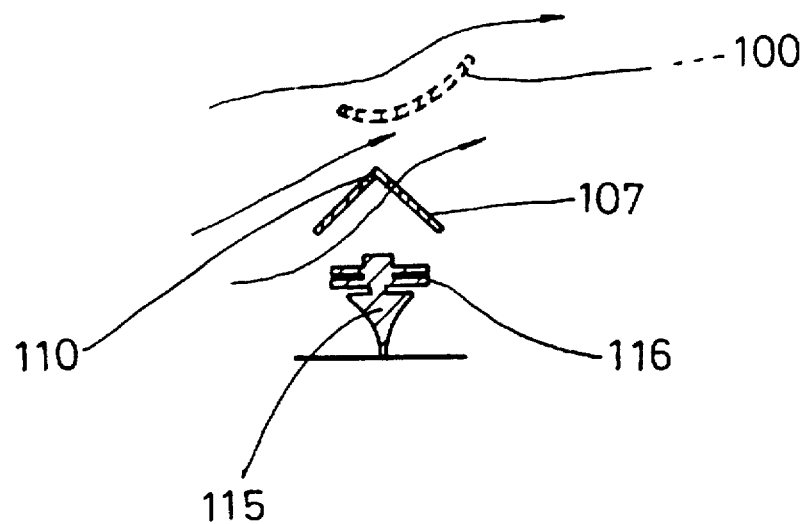
Figure 6A:
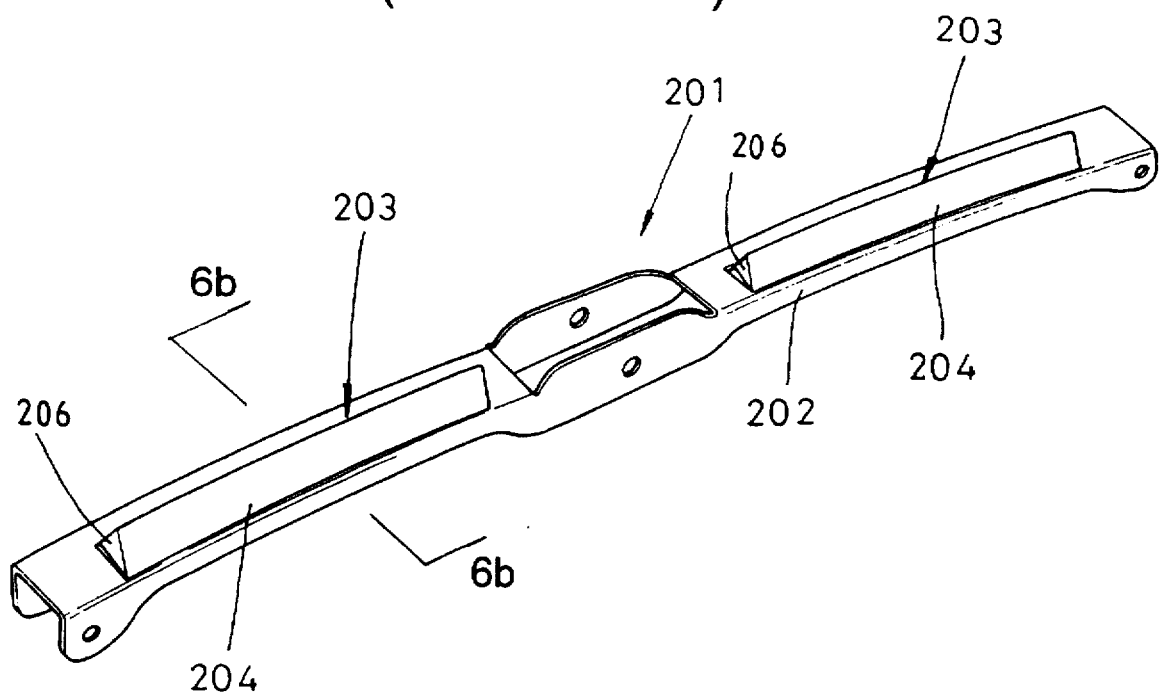
Figure 6B:
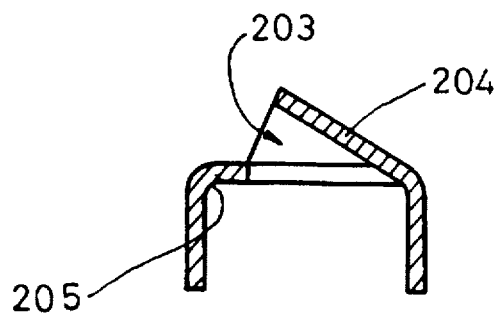

FIG. 5a is a front view of a typical windshield wiper in accordance with the prior art;

FIG. 5b is a cross-sectional view of the wiper taken along the line 5b—5b of FIG. 5a;

FIG. 6a is a schematic perspective view of a typical windshield wiper in accordance with the other embodiment of the prior art; and FIG. 6bis a cross-sectional view of the wiper taken along the line 6b—65b of FIG. 6a.

DESCRIPTION OF THE PREFERRED EMBODIMENT

Figure 1:
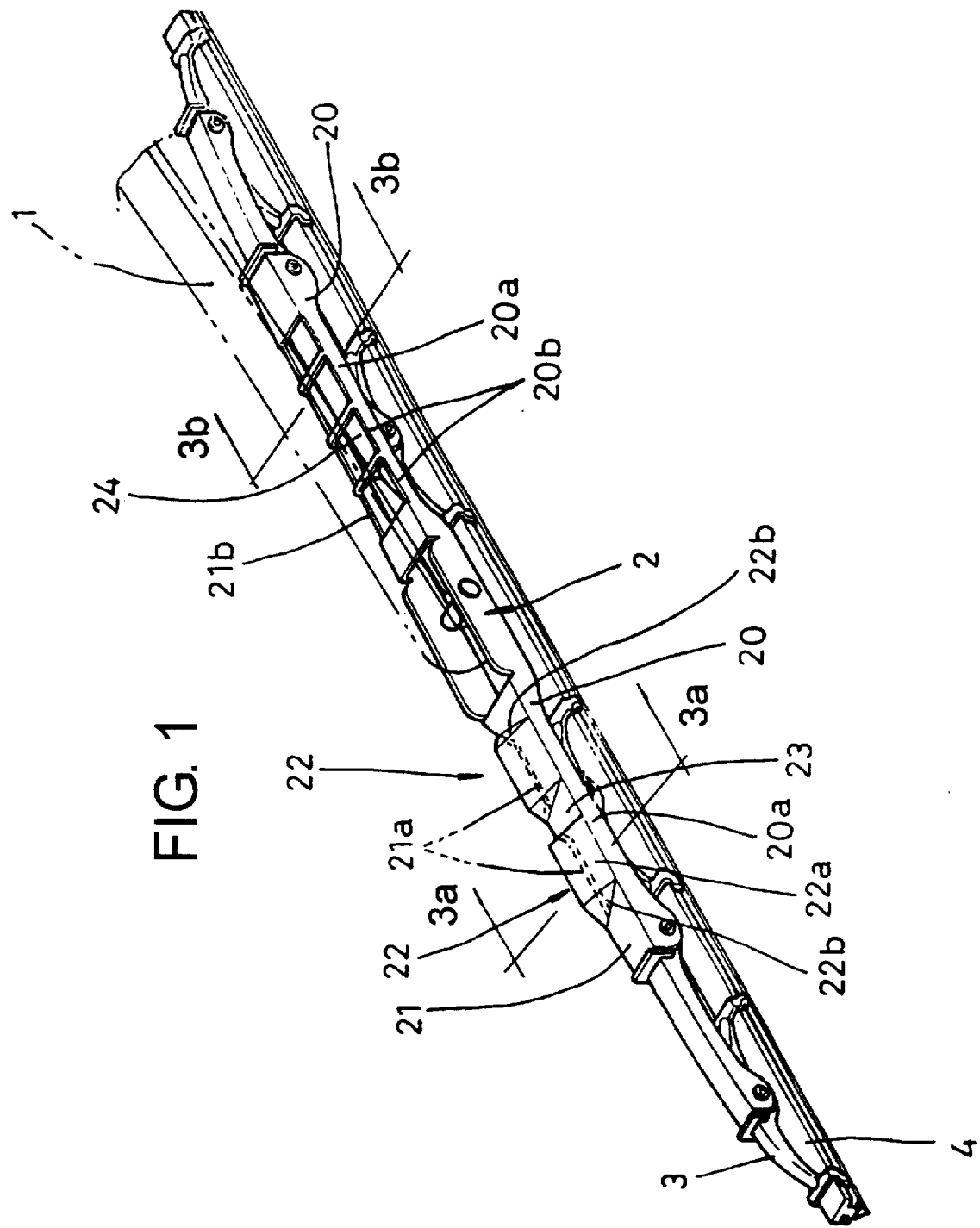
FIG. 1 is a perspective view of a windshield wiper in accordance with the preferred embodiment the present invention.
Figure 2:
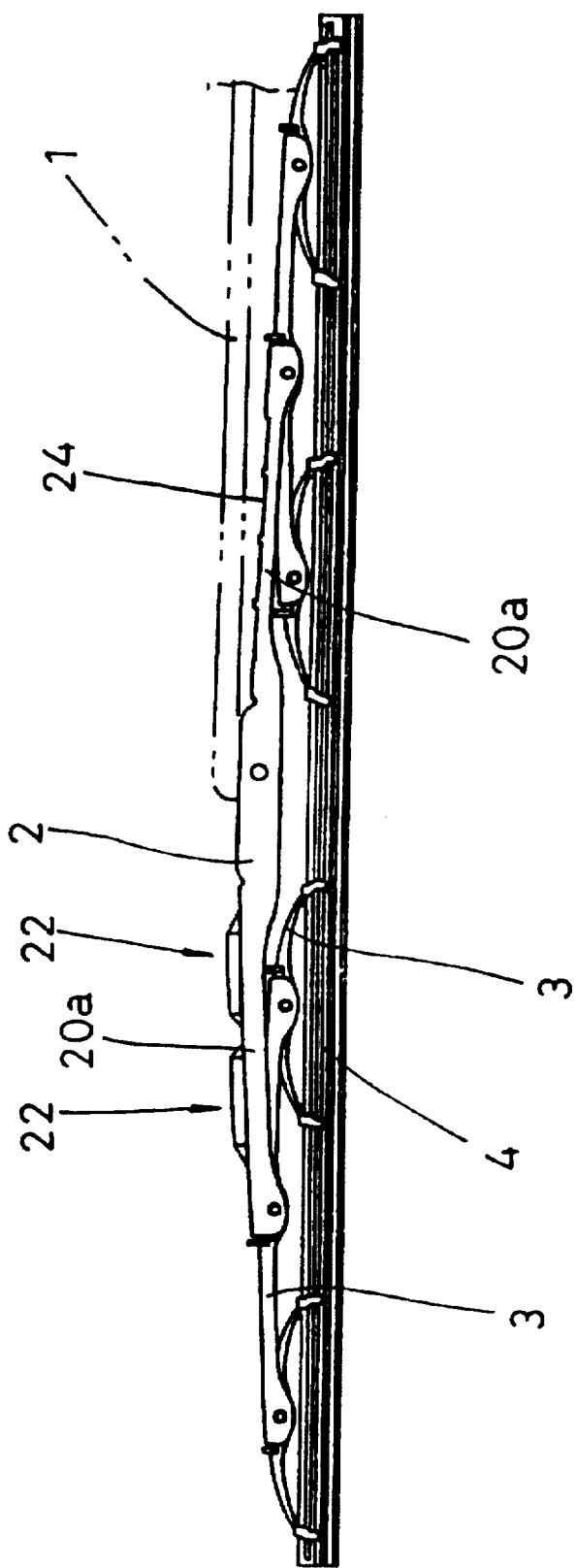
FIG. 2 is a front view of the wiper of FIG. 1.

FIGS. 1 and 2 are views illustrating the construction of a windshield wiper for automobiles in accordance with the present invention.

As shown in FIGS. 1 and 2, the wiper of this invention comprises a wiper frame 2 connected to a wiper arm 1. At least two stays 3 are mounted to both end portions of the wiper frame 2, while a blade 4 is mounted to the stays 3. Two or more spoiler parts 22 are formed on one side of the frame's top wall, while a plurality of vent openings 24 are formed on the other side of the frame's top wall.

Each of the above spoiler parts 22 consists of a top spoiler 22a and two side slant walls 22b. The top spoiler 22a and the side slant walls 22b are formed at one time into an integrated body. That is, the top wall of the wiper frame 2 is primarily cut along a cutting line 21a at the corner between the top wall and the upper side wall of the frame 2. The cut part is, thereafter, bent upwardly, thus forming a spoiler part 22 having both a top spoiler 22a and two side slant walls 22b. A reinforcing rib 23 is formed between the spoiler parts 22 so as to increase the strength of the wiper frame 2.

Figure 4:
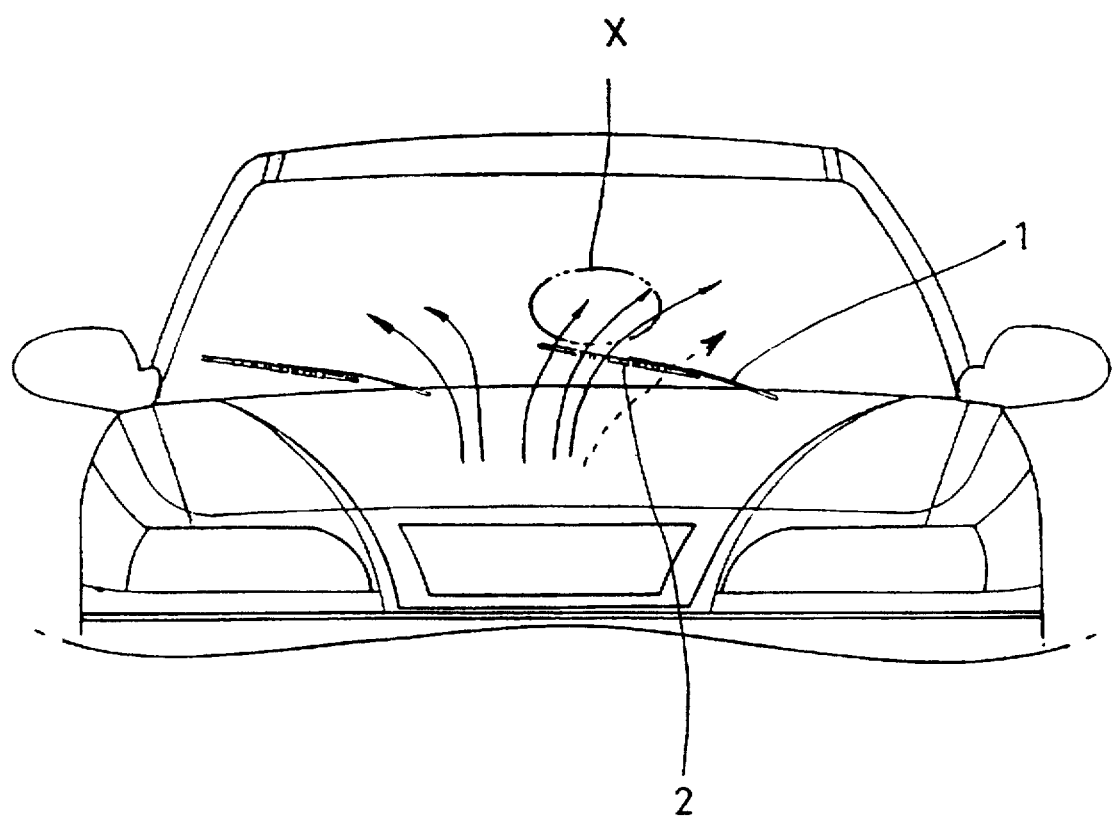
FIG. 4 is a view illustrating the air current formed around the wiper according to the present invention.

FIG. 4 is a view illustrating the air current formed around a wiper. As shown in the drawing, while driving a car, the wind flows along the hood of a car and comes into contact with the windshield. Thereafter, the wind separately blows at both side portions of the windshield and is concentrated on the upper portion X of a wiper, thus unexpectedly separating the wiper's blade from the windshield. However, the blade of this invention is effectively and stably kept on the windshield due to both the spoiler parts 22 and the vent openings 24.

In a detailed description, the lower side wall 20 of the wiper frame 2 is inclined at an angle of inclination, thus forming a slope surface 20a suitable for allowing air to quickly flow along the outer surface of the wiper frame 2.

Figure 3A:
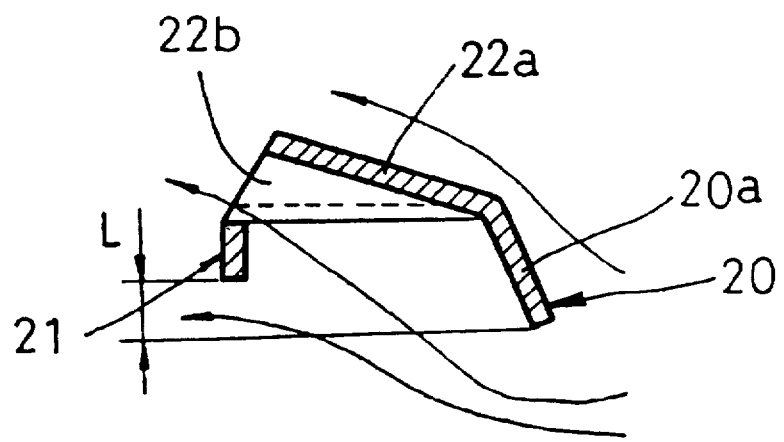
FIG. 3a is a cross-sectional view of the wiper taken along the line 3a—3a of FIG. 1.

That is, while driving a car, air primarily flows upwardly along the slope surface 20a and secondarily flows along the top spoiler 22a while reducing the air resistance In addition, the upper side wall 21 of the wiper frame 2 has a width of less than that of the lower side wall 20, thus forming a gap "L" under the edge as shown in FIG. 3a. Therefore, the outlet passage for air, which is introduced into the interior of the wiper frame 2, is divided into two passages. That is, the air is discharged from the interior of the frame 2 through both the spoiler parts 22 and the gap "L". The wiper is thus almost completely kept on the windshield.

Referring to FIG. 1, each of the side slant walls 22b is tapered in a direction toward the lower side wall 20 of the wiper frame 2 and is integrated with both the wiper frame 2 and the top spoiler 22a into a single body. It is thus possible to prevent air from forming a vortex at positions above and under the wiper frame 2, thus helping to keep the wiper on the windshield.

4

Figure 3B:
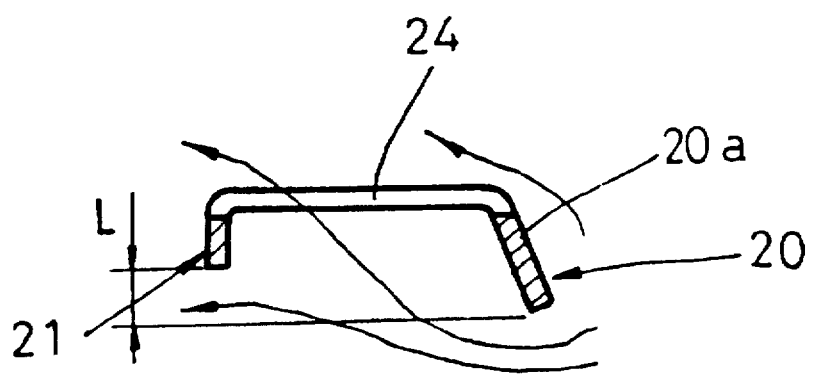
FIG. 3b is a cross-sectional view of the wiper taken along the line 3b—3b of FIG. 1.

FIG. 3b is a sectional view of the wiper taken along the line 3b—3b of FIG. 1. As shown in FIG. 3b, the vent openings 24 are formed abreast on the top wall of the wiper frame 2 by cutting the top wall from corner to corner with a plurality of reinforcing ribs being formed between the openings 24. That is, each of the vent openings 24 is formed by cutting off the frame's top wall along the cutting lines 20b and 21b at the corners between the top wall and both side walls 20 and 21 of the frame 2. In the same manner as described for FIG. 3a, the lower side wall 20 of the wiper frame 2 is inclined at an angle of inclination, thus forming a slope surface 20a. In addition, the frame's upper side wall 21 has a width of less than that of the lower side wall 20, thus forming a gap "L" under the edge.

The air is thus discharged from the interior of the frame 2 through both the vent openings 24 and the gap "L". It is thus possible to keep the wiper on the windshield.

As mentioned above, the windshield wiper for automobiles of this invention has a configuration capable of reducing wind resistance. The wiper is thus kept on the windshield.

Also, a spoiler part is formed on one side portion of the frame's top wall, while a vent opening is formed on the other side portion of the top wall. Therefore, it is easy to mount a wiper arm to the wiper frame because the vent opening does not interfere with the wiper arm.

In the wiper frame of this invention, both the spoiler part and the vent opening are individually formed by cutting the frame's top wall from corner to corner, thus being free from any corner causing a vortex of air. In addition, the frame's upper side wall has a width of less than that of the lower side wall, thus forming a gap under the edge. Due to the gap, the wiper is almost completely kept on the windshield.

Another advantage of the invention resides in that a reinforcing rib is formed between the spoiler parts and a reinforcing rib is also formed between the vent openings, thereby improving the strength of the wiper frame.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A windshield wiper for automobiles having a longitudinal wiper frame connected to a wiper arm, at least two stays mounted to both end portions of said wiper frame and a longitudinal blade held by said stays, said wiper frame comprising:

a top wall joining spaced upper and lower side walls; and at least two spoiler parts formed on one side portion of the wiper frame's top wall, each of said spoiler parts comprising:

an inclined top spoiler formed by partially cutting at a position around a junction between the top wall and the upper side wall and bending a cut part upwardly at an angle of inclination with a vent hole being defined on the top wall; and two side slant walls closing both ends of the top spoiler and being started with respect to top wall;

a reinforcing rib formed between said spoiler parts so as to increase strength of the wiper frame; and a plurality of vent openings formed on other side portion of the wiper frame's top wall.

2. A wiper as claimed in claim 1, wherein the lower side wall of said wiper frame is inclined at an angle of inclination with respect to the top wall suitable for allowing air to quickly pass through the wiper frame and depressing the wiper frame, thus helping to keep the wiper on a windshield.

3. A wiper as claimed in claim 1, wherein the upper side wall of said wiper frame has a width of less than the lower side wall of the frame, thus forming a gap under its edge and allowing air to pass through the gap.

4. A wiper as claimed in claim 1, wherein each of said side slant walls is tapered in a direction toward the lower side wall of the wiper frame and is integrated with both said wiper frame and said top spoiler into a single body.

5. A wiper as claimed in claim 1, wherein said vent openings are formed abreast on the top wall of the wiper frame by cutting the top wall between corners with the side walls with a plurality of reinforcing ribs being formed between the openings.

* * * * *